United States Patent
Jones et al.

(10) Patent No.: US 7,040,465 B2
(45) Date of Patent: May 9, 2006

(54) SLACK ADJUSTER WITH WEAR REDUCTION

(75) Inventors: Dean R. Jones, Elyria, OH (US); Joseph A. Miranda, LaGrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/669,226

(22) Filed: Sep. 24, 2003

(65) Prior Publication Data

US 2005/0061589 A1 Mar. 24, 2005

(51) Int. Cl.
*F16D 65/38* (2006.01)

(52) U.S. Cl. .................. 188/196 V; 188/79.55

(58) Field of Classification Search ............ 188/196 V, 188/196 BA, 79.55
See application file for complete search history.

(56) References Cited

U.S. PATENT DOCUMENTS

| | | | |
|---|---|---|---|
| 1,852,776 A * | 4/1932 | Hodeaux ............... 74/425 |
| 2,113,817 A | 4/1938 | Sneddon |
| 2,211,788 A | 8/1940 | Lucht |
| 2,379,796 A * | 7/1945 | Freeman et al. ....... 188/196 BA |
| 2,650,681 A * | 9/1953 | Shively ............... 188/79.55 |
| 2,815,253 A | 12/1957 | Spriggs |
| 2,964,341 A | 12/1960 | Doyle et al. |
| 3,008,779 A | 11/1961 | Spriggs |
| 3,236,573 A | 2/1966 | Donnellan |
| 3,373,637 A * | 3/1968 | Behnke ............... 81/57.17 |
| 3,482,663 A | 12/1969 | McGregor et al. |
| 3,502,380 A | 3/1970 | Adinoff |
| 3,507,369 A * | 4/1970 | Oliver ............... 188/196 BA |
| 3,949,840 A * | 4/1976 | Cumming et al. ....... 188/79.55 |
| 4,150,735 A * | 4/1979 | Acre et al. ........... 188/196 BA |
| 4,249,644 A * | 2/1981 | Urban ............... 188/196 D |
| 4,343,561 A * | 8/1982 | Campanini ............. 188/79.55 |
| 4,380,276 A * | 4/1983 | Sweet et al. ........... 188/79.55 |
| 4,421,211 A | 12/1983 | Hoffman et al. |
| 4,499,978 A * | 2/1985 | Norcross ............. 188/79.55 |
| 4,802,374 A | 2/1989 | Hamelin et al. |
| 4,825,979 A * | 5/1989 | Svensson ............. 188/79.55 |
| 4,880,085 A | 11/1989 | Taylor |
| 4,913,562 A | 4/1990 | Rosen |
| 5,305,856 A | 4/1994 | Edwards |
| 5,477,945 A * | 12/1995 | Klass et al. ........... 188/79.51 |
| 5,595,452 A | 1/1997 | Hill et al. |

(Continued)

FOREIGN PATENT DOCUMENTS

DE 19647139 A1 5/1997

(Continued)

*Primary Examiner*—Robert A. Siconolfi
(74) *Attorney, Agent, or Firm*—Calfee, Halter & Griswold LLP

(57) ABSTRACT

A slack adjuster for a vehicle brake includes a slack adjuster body having a cylindrical inner surface at least partially defining a chamber in the body. A worm gear is received in the chamber in the body. At least one low friction ring is interposed between the worm gear and the body and supports the worm gear for rotation in the chamber in the body. A method of remanufacturing a slack adjuster includes the steps of removing a worm gear and at least one low friction ring from a body of the slack adjuster; setting aside the removed low friction ring; and putting the worm gear and at least one new low friction ring into the body.

20 Claims, 4 Drawing Sheets

U.S. PATENT DOCUMENTS

| | | |
|---|---|---|
| 5,913,937 A | 6/1999 | Lin |
| 5,988,614 A | 11/1999 | Sturmon |
| 6,257,085 B1 | 7/2001 | Bokamper et al. |
| 6,305,236 B1 * | 10/2001 | Sturdevant .................. 74/425 |
| 6,352,006 B1 | 3/2002 | Kurashita |
| 6,408,993 B1 * | 6/2002 | Truuvert .................. 188/79.55 |
| 2002/0025092 A1 | 2/2002 | Muruyama et al. |

FOREIGN PATENT DOCUMENTS

| | | |
|---|---|---|
| GB | 1025398 A | 4/1966 |

* cited by examiner

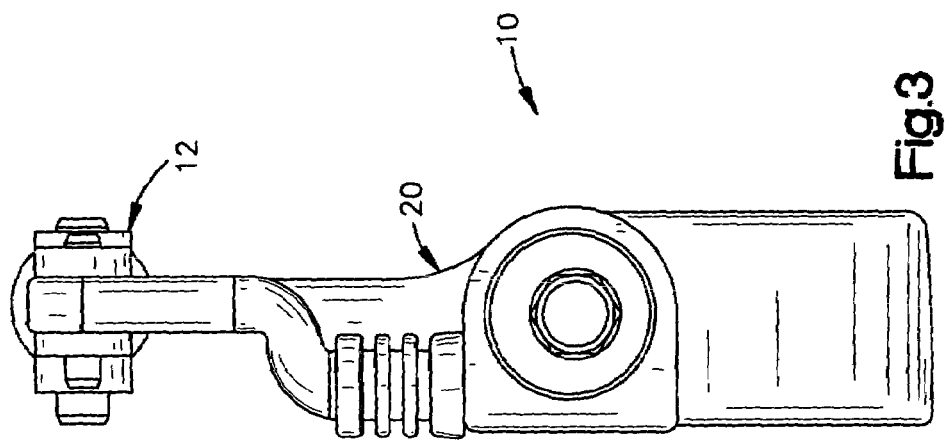
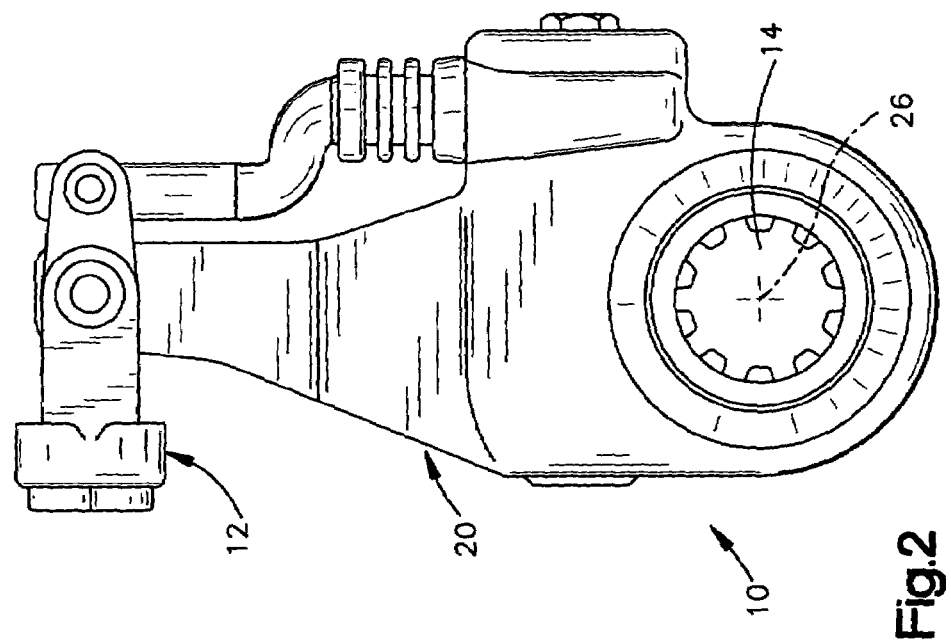

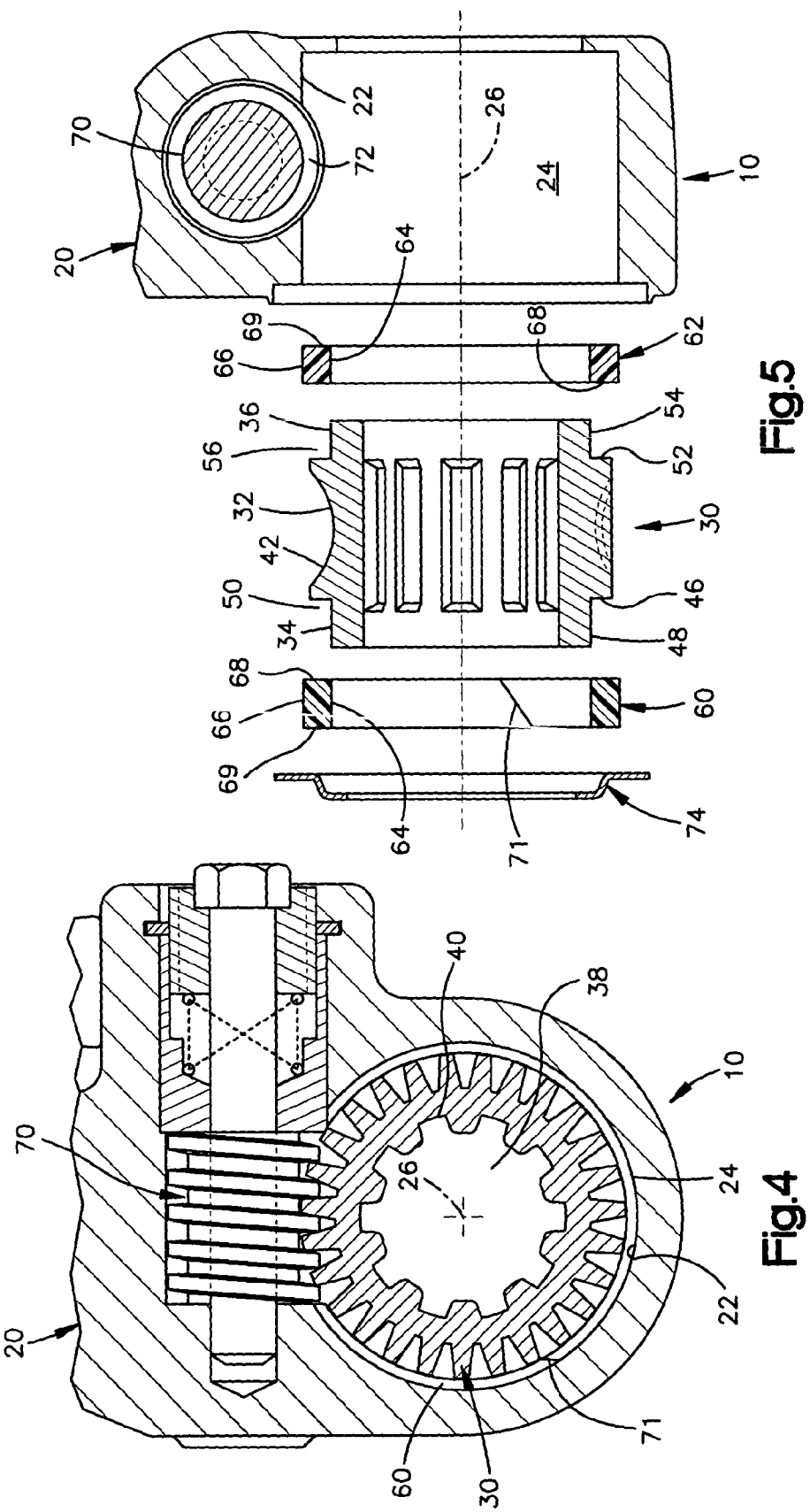

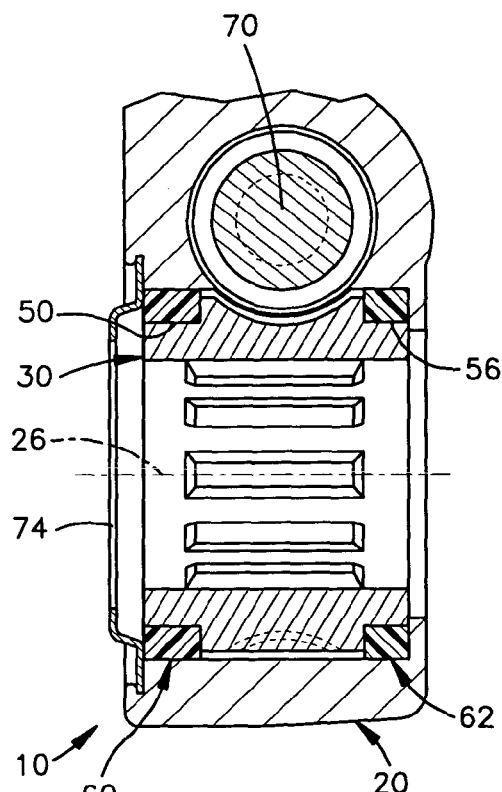
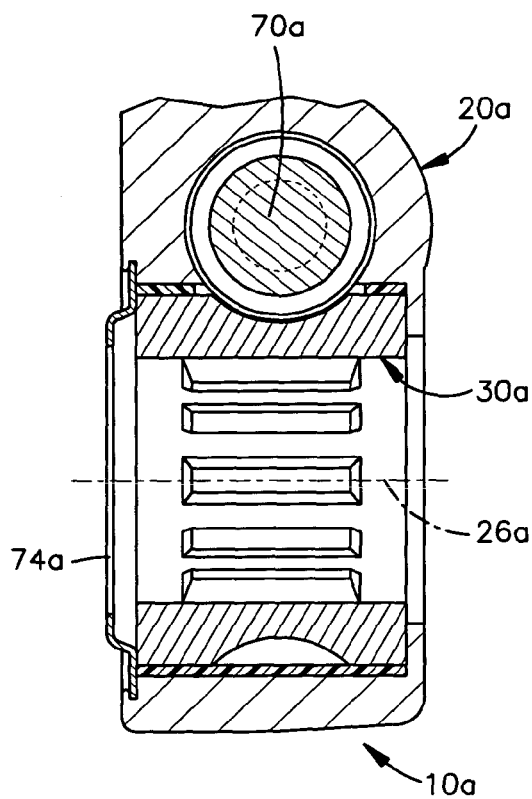
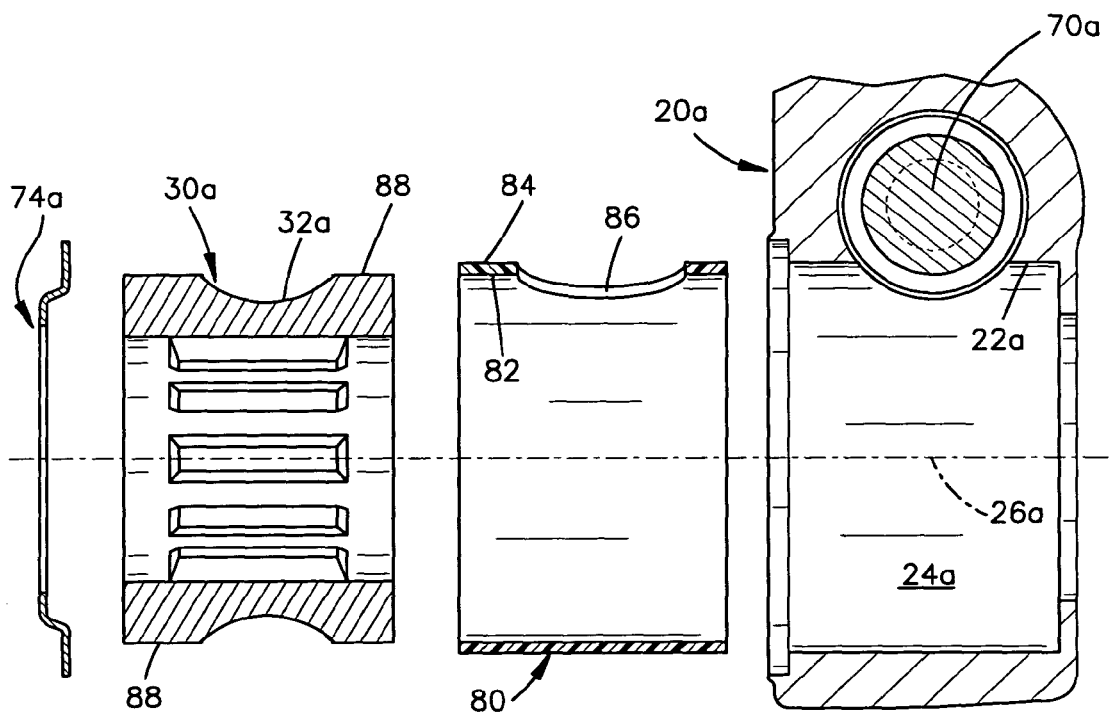

SLACK ADJUSTER WITH WEAR REDUCTION

BACKGROUND OF THE INVENTION

The present invention relates to a slack adjuster. A slack adjuster is an integral part of actuating linkage for a vehicle air brake system on heavy duty vehicles, such as buses and trucks. The slack adjuster transmits braking force to a brake shaft, which applies the braking force to a cam and thereby to the brake shoes and drum associated with a road wheel of the vehicle.

One common type of slack adjuster includes a worm and a worm gear that are in meshing engagement within a housing or body. The worm gear is a metal gear that rotates within a cylindrical opening in a metal body. Annular shoulders on the worm gear engage the cylindrical surface of the body, to support the worm gear for rotation within the body. The brake shaft extends through the adjuster and is fixed for rotation with the worm gear by a splined connection. The worm and the worm gear are relatively rotatable to effect adjustment of the linkage to accommodate clearance that develops in the system with extended usage of the brake.

In this type of slack adjuster, the braking force is applied to the body of the slack adjuster through an actuator. The body transmits the braking force, through the worm and the worm gear, to the splined connection with the brake shaft. The brake shaft is thus rotated to actuate the brake.

The worm gear is subjected to the entire braking force passing through the brake adjuster. The resulting force presses the worm gear against the body which causes a substantial amount of friction. This friction in turn causes galling of the body material and worm gear as they interface. When the damage from galling becomes severe the performance of the slack adjuster can be greatly reduced.

SUMMARY OF THE INVENTION

The present invention relates to a slack adjuster for a vehicle brake. The adjuster includes a slack adjuster body having a cylindrical inner surface at least partially defining a chamber in the body. A worm gear is received in the chamber in the body. At least one low friction ring is interposed between the worm gear and the body and supports the worm gear for rotation in the chamber in the body.

The present invention also relates to a method of remanufacturing a slack adjuster including the steps of removing a worm gear and at least one low friction ring from a body of the slack adjuster; setting aside the removed low friction ring; and putting the worm gear and at least one new low friction ring into the body.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is a front elevational view of the slack adjuster of FIG. 1;

FIG. 3 is a side elevational view of the slack adjuster of FIG. 1;

FIG. 4 is a radial sectional view of the slack adjuster of FIG. 1;

FIG. 5 is an exploded sectional view of the slack adjuster of FIG. 1;

FIG. 6 is an axial sectional view of the slack adjuster of FIG. 1;

FIG. 7 is an axial sectional view of a slack adjuster in accordance with a second embodiment of the invention;

FIG. 8 is an exploded sectional view of the slack adjuster of FIG. 7.

DESCRIPTION OF THE INVENTION

Figure 1:
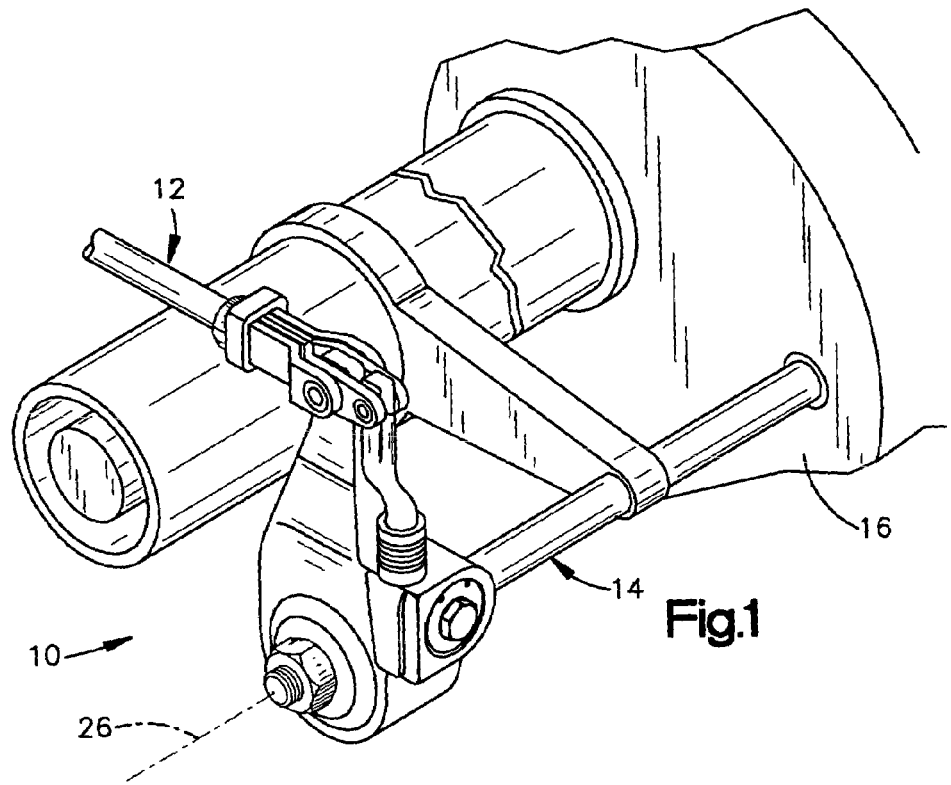
FIG. 1 is a perspective view of a slack adjuster in accordance with a first embodiment of the invention.

The present invention relates to a slack adjuster and is applicable to various slack adjuster constructions. As representative of the present invention, FIGS. 1–6 illustrate a slack adjuster 10 in accordance with a first embodiment of the invention The slack adjuster 10 (FIGS. 1–3) is connected between brake linkage 12 that forms a part of an actuator, and a brake shaft 14. The application of an actuating (braking) force to the linkage 12 will operate through the adjuster 10 to rotate the brake shaft 14 and apply the brakes by engaging brake shoes with the brake drum 16. The slack adjuster 10 is adjustable, in a known manner, to take up the slack in the brake system which occurs after prolonged use.

The slack adjuster 10 (FIGS. 4 and 5) includes a body 20 having a cylindrical inner surface 22. The surface 22 defines a circular central opening or chamber 24 centered on an axis 26.

A worm gear 30 is received in the chamber 24 and is rotatable in the chamber about the axis 26. The worm gear 30 has a generally cylindrical configuration including an intermediate gear tooth portion 32 and first and second end portions 34 and 36. The intermediate portion 32 of the worm gear 30 includes a set of spiral gear teeth 42. The worm gear 30 has a central opening 38 that receives the brake shaft 14 in a splined connection 40.

The intermediate portion 32 of the worm gear 30 has an annular, radially extending surface 46 that forms an edge of the gear tooth portion of the worm gear. The surface 46 faces axially outward of the worm gear 40. The first end portion 34 of the worm gear 30 has a cylindrical surface 48 that extends axially outward from the radially extending surface 46. The two surfaces 46 and 48 form a first shoulder 50, on the worm gear 30, facing away from the central gear tooth portion 32 of the worm gear.

The central portion 22 of the worm gear 30 has an annular, radially extending surface 52 that forms an edge of the gear tooth portion of the worm gear. The surface 52 faces axially outward of the worm gear 30. The second end portion 36 of the worm gear 30 has a cylindrical surface 54 that extends axially outward from the radially extending surface 52. The two surfaces 52 and 54 form a second shoulder 56, on the worm gear 30, facing away from the central gear tooth portion 32 of the worm gear.

The slack adjuster 10 includes one or more bearings or low friction rings for reducing friction between the worm gear 30 and the body 20. In the embodiment illustrated in FIGS. 1–6, the slack adjuster 10 includes two low friction rings 60 and 62. In the embodiment illustrated in FIGS. 7–8 and described below, the slack adjuster 10a includes one low friction ring 80. In other embodiments of a slack adjuster in accordance with the invention, more than two low friction rings may be included, and the low friction rings may be of a different type than as illustrated herein.

The two low friction rings 60 and 62 shown in FIGS. 5 and 6 are identical to each other. In other embodiments they may be different, for example, of differing axial widths to fit a particular slack adjuster. Each low friction ring 60 or 62 is an annulus or ring having a cylindrical inner side surface 64, a cylindrical outer side surface 66, and parallel, radially extending inner and outer edge surfaces 68 and 69. A low friction ring of the present invention may be split as illustrated at 71 (FIG. 4), or may be solid (unbroken around its circumference).

The low friction rings of the present invention are made from a material having a lower coefficient of friction than the worm gear itself on metal. One suitable material is nylon. Another suitable material is bronze. Other materials may be used.

Each low friction ring 60 or 62 is located in one of the shoulders 50 or 56 of the worm gear 30. The inner side surface 64 of the first low friction ring 60 engages the cylindrical surface 48 of the first shoulder 50 of the worm gear 30. The inner edge surface 68 of the ring 60 engages the annular side surface 46 of the first shoulder 50.

The inner side surface 64 of the second low friction ring 62 engages the cylindrical surface 54 of the second shoulder 56 of the worm gear 30. The inner edge surface 68 of the ring 62 engages the annular side surface 52 of the second shoulder. The outer edge surfaces 69 of the rings 60 and 62 engage the inner wall of the body 20 and the cover 74. The rings 60 and 62 thus provide a low-friction fit between the worm gear 30 and the body 20 in an axial direction as well.

The outer diameter of the low friction rings 60 and 62 is greater than the outer diameter of any portion of the worm gear 30 including the first and second end portions 34 and 36 and the central gear tooth portion 32. As a result, the gear teeth 42 on the worm gear 30 have a smaller diameter than the low friction rings 60 and 62.

The slack adjuster 10 also includes a worm 70 located in the body 20 and in meshing engagement with the worm gear 30. The worm 70 projects through a cutout 72 in the inner surface 22 of the body 20 to enable the worm to mesh with the worm gear 30. The slack adjuster 10 also includes a cover 74 that closes the open end of the chamber 24 and helps to retain the worm gear 30 and the low friction rings 60 and 62.

When the low friction rings 60 and 62 and the worm gear 30 are in the body 20, the low friction rings support the worm gear for rotation relative to the body, about the axis 26. The outer side surfaces 66 of the low friction rings 60 and 62 engage the cylindrical inner surface 22 of the body 20. No portion of the worm gear including the first and second end portions 34 and 36 and the central gear tooth portion 32 engages the inner surface 22 of the body 20. As a result, the worm gear 30 can rotate within the body 20 without engaging the body. When a load is applied to the worm gear 30 that tends to urge the worm gear in a direction radially toward the body 20, the low friction rings 60 and 62 transmit that load to the body without engagement of the worm gear with the body.

The low friction rings 60 and 62 thus reduce wear on the worm gear 30 and on the body 20. Specifically, slack adjusters 10 including the low friction rings 60 and 62, in repeated testing, show 5 times as much useful life as those without the low friction rings. This 400% increase in useful life is attained with minimal increase in cost or manufacturing complexity compared to the overall cost of the slack adjuster. Also, a less forceful actuator can be used, and still maintain proper slack adjuster operation.

Figure 9:
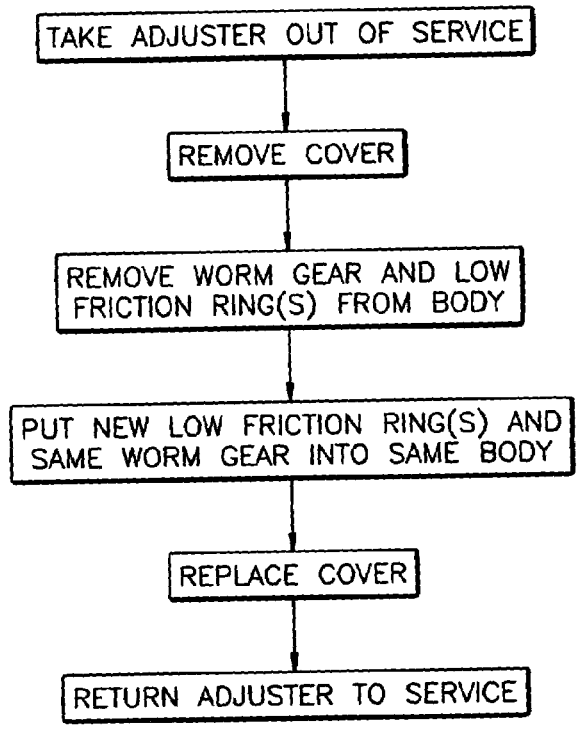
FIG. 9 illustrates graphically a method of remanufacturing a slack adjuster in accordance with the invention.

In addition, the amount of wear experienced by the worm gear 30 and the body 20 is so low that a slack adjuster 10 including the low friction rings 60 and 62 is remanufacturable. The slack adjuster can be remanufactured (rebuilt) in the following manner, as illustrated graphically in FIG. 9.

The cover 74 on the end of the body 20 is removed. The worm gear 30 and the low friction rings 60 and 62 are removed. The used low friction rings 60 and 62 are set aside. New low friction rings 60 and 62 are placed on the same worm gear 30 or in the same body 20. The worm gear and the new low friction rings are placed again in the chamber in the body. The removed cover 74 is replaced. At this point, a fully functional slack adjuster 10 is available for reuse or sale, using the previous body and worm gear.

FIGS. 7 and 8 illustrate a slack adjuster 10$a$ constructed in accordance with a second embodiment of the invention. The slack adjuster 10$a$ is generally similar in construction to the slack adjuster 10 (FIGS. 1–6), and parts that are the same or similar are given the same reference numeral with the suffix "a" added.

In the slack adjuster 10$a$, a single low friction ring in the form of a wear sleeve 80 is supported on the body 20$a$, in place of the two low friction rings 50 and 62 that are on the worm gear. The sleeve 80 is preferably made from nylon, but may alternatively be made from another low friction material, such as oil-impregnated bronze.

The sleeve 80 has a cylindrical configuration including parallel inner and outer side surfaces 82 and 84. The sleeve 80 is fitted in the chamber 24$a$ in the body 20$a$. The chamber 24$a$ may be made larger in diameter that the chamber 24, to accommodate the sleeve 80. The sleeve 80 is fixed in the body 20$a$ in a manner not shown. The sleeve 80 has a cutout 86 that aligns with the cutout in the body 20$a$ to enable the worm to mesh with the worm gear.

The end portions of the worm gear 30 are formed as lands 88 that are larger in diameter than the central gear tooth portion 32$a$. The lands 88 have cylindrical outer side surfaces that engage the cylindrical inner surface 22$a$ of the sleeve 80.

When the worm gear 30$a$ rotates in the body 20$a$, the metal of the lands 88 of the worm gear rides against the low friction material of the sleeve 80. The friction between these parts is substantially less than the friction between a metal worm gear and a metal body. Test results show a reduction in wear and an increase in product life similar to that experienced with the first embodiment (FIGS. 1–6). In addition, the adjuster 10$a$ is remanufacturable in the manner shown in FIG. 9 and described above with reference to the adjuster 10.

From the above description of the invention, those skilled in the art will perceive improvements, changes, and modifications in the invention. Such improvements, changes, and modifications within the skill of the art are intended to be included within the scope of the appended claims.

We claim:

1. A slack adjuster for a vehicle brake, said slack adjuster comprising:

a slack adjuster body having a cylindrical inner surface at least partially defining a chamber in said body;

a worm gear received in said chamber in said body; and at least one low friction ring engaging said worm gear and said body and supporting said worm gear for rotation in said chamber in said body.

2. A slack adjuster as set forth in claim 1 wherein said worm gear has a gear tooth portion between first and second end portions, said slack adjuster comprising a first and second low friction rings on opposite ends of said gear tooth portion of said worn gear.

3. A slack adjuster as set forth in claim 2 wherein said worm gear has first and second shoulders on opposite ends of said gear tooth portion, said first low friction ring being located on said first shoulder and said second low friction ring being located on said second shoulder.

4. A slack adjuster as set forth in claim 3 wherein said low function rings provide both axial and radial support of said worm gear in said body.

5. A slack adjuster as set forth in claim 3 wherein said low friction rings are made from nylon.

6. A slack adjuster as set forth in claim 3 wherein said low friction rings are made from oil-impregnated bronze.

7. A slack adjuster as set forth in claim 2 wherein said low friction rings are split rings.

8. A slack adjuster as set forth in claim 1 wherein said low function ring provides both axial and radial support of said worm gear in said body.

9. A slack adjuster as set forth in claim 1 wherein said low friction ring comprises a cylindrical sleeve received in said chamber in said slack adjuster body, said worm gear having a gear tooth portion between first and second lands, said sleeve being axially co-extensive with said gear tooth portion and with said lands of said worm gear, said lands engaging said sleeve to support said worm gear in said body.

10. A slack adjuster as set forth in claim 9 wherein said sleeve is made from nylon.

11. A slack adjuster as set forth in claim 9 wherein said sleeve is made from oil-impregnated bronze.

12. A slack adjuster as set froth in claim 10 further comprising a worm for adjusting said slack adjuster, said sleeve having an opening for allowing said worm to project into said sleeve to engage said worm gear.

13. A slack adjuster as set forth in claim 9 wherein said sleeve is a split sleeve.

14. A slack adjuster for a vehicle brake, said slack adjuster comprising:

a slack adjuster body having a cylindrical inner surface at least partially defining a chamber in said body;

a worm gear received in said chamber in said body; and means for engaging said worm gear and said body and for supporting said worm gear for rotation in said chamber in said body.

15. A slack adjuster as set forth in claim 14 wherein said means comprises a low friction ring.

16. A slack adjuster as set forth in claim 15 wherein said means comprises a plurality of low friction rings.

17. A slack adjuster as set forth in claim 14 wherein the worm gear has a gear tooth portion between first and second end portions, said means comprising first and second low friction rings on opposite ends of the gear tooth portion of the worm gear.

18. A slack adjuster as set forth in claim 17 wherein the worm gear has first and second shoulders on opposite ends of the gear tooth portion, the first low friction ring being located on the first shoulder and the second low friction ring being located on the second shoulder.

19. A slack adjuster as set forth in claim 18 wherein the low friction rigs provide both axial and radial support of the worm gear in the body.

20. A slack adjuster as set forth in claim 14 wherein the means comprises a cylindrical sleeve received in the chamber in the slack adjuster body, the worm gear having a gear tooth portion between first and second lands, the sleeve being axially co-extensive with the gear tooth portion and with the lands of the worm gear, the lands engaging the sleeve to support the worm gear in the body.

* * * * *